US010229463B2

(12) United States Patent
Palombo et al.

(10) Patent No.: US 10,229,463 B2
(45) Date of Patent: Mar. 12, 2019

(54) SYSTEM AND METHOD FOR INTRADAY LIQUIDITY ANALYTICS

(71) Applicant: THE BANK OF NEW YORK MELLON, New York, NY (US)

(72) Inventors: Michelle A. Palombo, New York, NY (US); Gregory P. Malosh, New York, NY (US)

(73) Assignee: The Bank of New York Mellon, New York, NY (US)

( * ) Notice: Subject to any disclaimer, the term of this patent is extended or adjusted under 35 U.S.C. 154(b) by 0 days.

(21) Appl. No.: 14/083,623

(22) Filed: Nov. 19, 2013

(65) Prior Publication Data

US 2015/0142622 A1     May 21, 2015

(51) Int. Cl.
*G06Q 40/00*     (2012.01)
(52) U.S. Cl.
CPC .................................. *G06Q 40/12* (2013.12)
(58) Field of Classification Search
CPC ........ G06Q 40/10; G06Q 40/02; G06Q 40/00; G06Q 30/04; G06Q 20/10
USPC .......................................................... 705/30
See application file for complete search history.

(56) References Cited

U.S. PATENT DOCUMENTS

| | | | |
|---|---|---|---|
| 8,145,552 B2 | 3/2012 | Blank | |
| 8,315,939 B2 | 11/2012 | Blank | |
| 8,478,679 B2 * | 7/2013 | Spirgel | G06Q 40/06 705/35 |
| 8,510,794 B1 | 8/2013 | Kaushik et al. | |
| 2002/0178102 A1 * | 11/2002 | Scheinberg | G06Q 40/04 705/37 |
| 2012/0166328 A1 | 6/2012 | Spirgel | |

OTHER PUBLICATIONS

U.S. Appl. No. 13/913,126, filed Jun. 7, 2013.
"BNY Mellon Launches Intraday Liquidity Analytics", News Release. [online]. BNY Mellon, May 10, 2013 [retrieved on Nov. 19, 2013]. Retrieved from the Internet: <URL: http://bnymellon.mediaroom.com/index.php?s=43&item=2190>.

* cited by examiner

*Primary Examiner* — Garcia Ade
(74) *Attorney, Agent, or Firm* — Pillsbury Winthrop Shaw Pittman, LLP

(57) ABSTRACT

A system for analyzing liquidity data for a client of a financial services provider includes processor(s), at the financial services provider, configured to execute computer program module(s). The modules are configured to receive a request from the client to generate a liquidity analysis based on client account(s), and, upon receiving the request, execute on the processors of the system, module(s) configured to aggregate liquidity data from a plurality of financial subsystems of the financial services provider as aggregated liquidity data. The aggregated data includes cash flows in transactions associated with the client accounts in one or more of the financial subsystems. The modules are further configured to execute on the processors, module(s) configured to generate a graphical depiction of at least a portion of the aggregated liquidity data over a time interval, based on the request, and transmit, for displaying on an electronic display at the client, the graphical depiction.

20 Claims, 9 Drawing Sheets

SYSTEM AND METHOD FOR INTRADAY LIQUIDITY ANALYTICS

BACKGROUND

This application is directed to computer-implemented systems and methods useful for analysis and management of liquidity. For example, aspects of the computerized systems and methods described herein may be associated with providing analysis of intraday liquidity flows, and facilitating adjustment to payment processes to reduce intraday overdrafts.

For example, a financial service provider may provide to clients a variety of services which may make use of the client's liquid assets. The clients may have a plurality of accounts at the financial service provider, operating over a variety of disparate systems. As such, the client may not have readily available access to information regarding their liquid assets across the variety of systems.

Among other things, what is needed is a system and method for providing centralized liquidity data in real time or on demand to clients such as investors and asset owners in an aggregated fashion across a plurality of accounts.

SUMMARY

Various embodiments of this disclosure may be used in conjunction with existing financial services platforms, such as The Bank of New York Mellon's treasury information reporting and transaction initiation system (TreasuryEdge$^{SM}$). Other financial services platforms, such as those associated with repurchase agreement products (RepoEdge®), derivatives margin management products (DM Edge®), as well as others such as repurchase agreement and margin management products (e.g., RM Edge®, MarginDirect$^{SM}$, and Derivatives Collateral Net (DCN)), may be interlinked, and may be accessed by clients via real-time, web-based portals, including TreasuryEdge$^{SM}$) and AccessEdge$^{SM}$. Features of these programs may be found in one or more of U.S. Pat. Nos. 8,145,552, 8,315,939, and 8,478,679, and U.S. patent application Ser. Nos. 13/411,090, 13/656,340, and 13/913,126, each of which are incorporated herein by reference in their entireties.

The operator/manager of the system and method of this disclosure may act as a service provider to investors or asset owners who may be clients of the service provider. The operator/manager may therefore perform various functions via the system and method which may provide value-added services leading to greater information transparency for the investors or asset owners, and enhance usage of their liquid assets.

According to an embodiment, a system for analyzing liquidity data for a client of a financial services provider includes one or more processors, at the financial services provider, the one or more processors being configured to execute one or more computer program modules. The program modules are configured to receive a request from the client to generate a liquidity analysis based on one or more client accounts. The modules are also configured to, upon receiving the request, execute on the one or more processors of the computer system, one or more computer modules configured to aggregate liquidity data from a plurality of financial subsystems of the financial services provider as aggregated liquidity data. The aggregated liquidity data includes cash flows in transactions associated with the client accounts in one or more of the plurality of financial subsystems. The program modules are further configured to execute on the one or more processors, one or more computer program modules configured to generate a graphical depiction of at least a portion of the aggregated liquidity data over a time interval, based on the request, transmit, for displaying on an electronic display at the client, the graphical depiction.

According to another embodiment, a computer implemented method for analyzing liquidity data for a client of a financial services provider, wherein the method is implemented in a computer system comprising one or more processors configured to execute one or more computer program modules, includes receiving, via the one or more processors, a request from the client to generate a liquidity analysis based on one or more client accounts. The method also includes, upon receiving the request, executing on the one or more processors of the computer system, one or more computer modules configured to aggregate liquidity data from a plurality of financial subsystems of the financial services provider as aggregated liquidity data, the aggregated liquidity data including cash flows in transactions associated with the client accounts in one or more of the plurality of financial subsystems. The method additionally includes executing on the one or more processors, one or more computer program modules configured to generate a graphical depiction of at least a portion of the aggregated liquidity data over a time interval, based on the request. The method further includes transmitting, for displaying on an electronic display at the client, the graphical depiction.

The system and method of this disclosure provides various capabilities as discussed more fully in the detailed description below.

BRIEF DISCUSSION OF THE DRAWINGS

FIGS. 2A-5 illustrate various exemplary views of a graphical user interface configured to facilitate aggregating and viewing liquidity data associated with a financial services provider;

DETAILED DESCRIPTION

In the discussion of various embodiments and aspects of the system and method of this disclosure, examples of a processor may include any one or more of, for instance, a personal computer, portable computer, personal digital assistant (PDA), workstation, or other processor-driven device, and examples of network may include, for example, a private network, the Internet, or other known network types, including both wired and wireless networks.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Described herein is an exemplary system which may be implemented through computer software running in a processor to provide liquidity data analytics. This description is not intended to be limiting, but is merely provided to describe ways of accomplishing the functions associated with acting as a financial service provider on behalf of an asset owner or investor.

Figure 1:
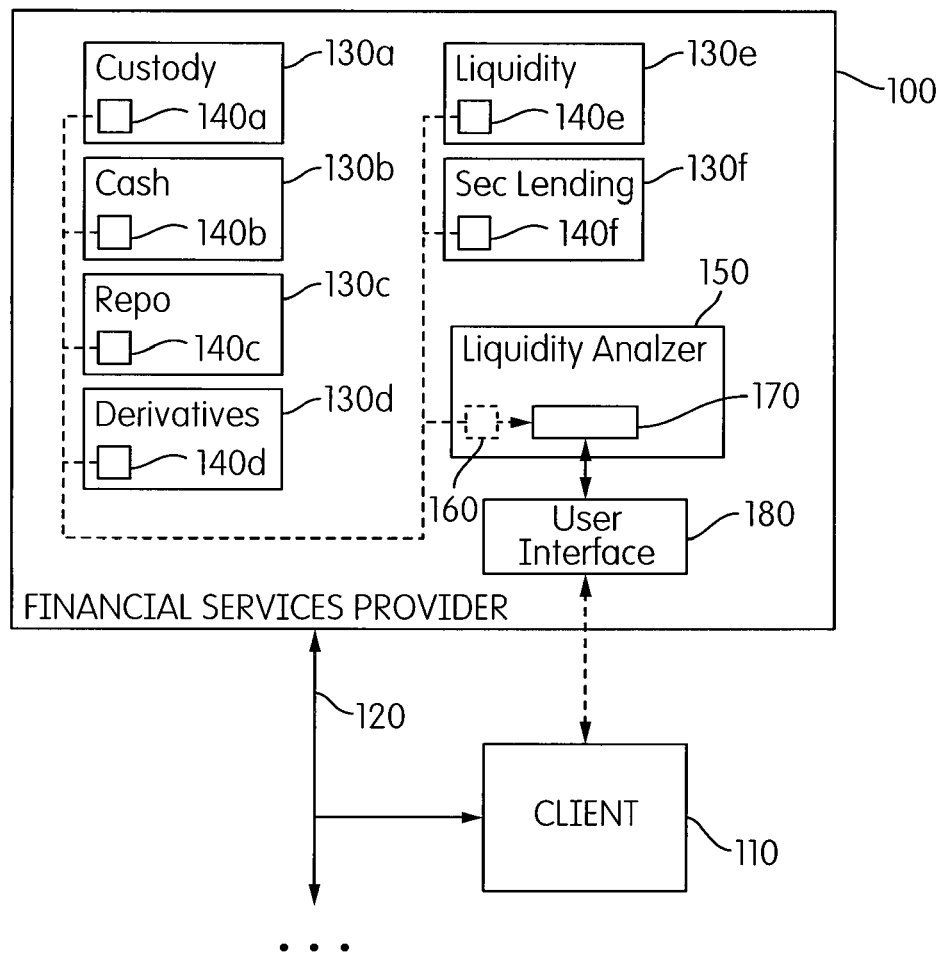
FIG. 1 illustrates a schematic embodiment of a system for aggregating and viewing liquidity data at a financial services provider.

FIG. 1 schematically illustrates a networked relationship between a financial services provider 100 and a client 110. As shown, the client 110 is linked to the financial services provider 100 by a network 120, and it may be understood that the network 120 may be coupling computer systems or processors associated with each of the financial services provider 100 and the client 110. While the financial services provider 100 may have a plurality of client 110 associated therewith (e.g., linked through the network 120), in the illustrated embodiment a single client 110 is shown for simplicity. In an embodiment, the financial services provider 100 may have various financial service subsystems 130 associated therewith. For example, as shown, in an embodiment the financial services provider 100 may have a custody subsystem 130a, a cash subsystem 130b, a repurchase agreement subsystem 130c, a derivatives subsystem 130d, a liquidity subsystem 130e, and a securities lending subsystem 130f. It may be appreciated that liquid asset information 140 associated with the client 110 may be associated with each of the subsystems 130. For example, liquid asset information 140a may be associated with the custody subsystem 130a, liquid asset information 140b may be associated with the cash subsystem 130b, liquid asset information 140c may be associated with the repurchase agreement subsystem 130c, liquid asset information 140d may be associated with the derivatives subsystem 130d, liquid asset information 140e may be associated with the liquidity subsystem 130e, and liquid asset information 140f may be associated with the securities lending subsystem 130f. In an embodiment, each of the financial subsystems 130 may comprise one or more processors configured to perform methods and processes associated with the financial services to which the subsystems 130 relate. In an embodiment, each of the financial subsystems 130 may include databases and storage devices configured to store associated data (including the liquid asset information 140) related to those disparate financial services. While the financial subsystems 130 are illustrated in FIG. 1 as being separate modules from one another, it may be appreciated that in an embodiment the financial subsystems 130 may share computer processors, databases, memory structures, storage devices, and/or other system components with one another, but may have separate components (in software or in hardware) which may be associated with the particular financial service associated with each subsystem 130.

As described herein, in an embodiment, the financial services provider 100 may provide liquidity analysis services to the client 110, wherein the liquid asset information 140 associated with each of the subsystems 130 may be aggregated by a liquidity analyzer 150. The liquidity analyzer 150 may comprise one or more processors configured to perform one or more data retrieval operations to measure cash inflows and outflows associated with the client 110 and each of the subsystems 130. In an embodiment, a data aggregator 160 may be used to retrieve the liquid asset information 140 from each of the subsystems 130, and compile the information as aggregated liquidity information 170. As described in greater detail below, upon aggregation by the data aggregator 160, the aggregated liquidity information may be further analyzed by the liquidity analyzer 150, and may be prepared for transmission to the client 110 via a user interface 180. It may be appreciated that the client 110 may be able to access the user interface 180 through a variety of appropriate mechanisms, including but not limited to accessing the user interface 180 via the network 120.

In an embodiment, the liquidity analyzer 150 may be configured to provide the client 110 views of their prior and/or current intraday balances across the subsystems 130. As described in greater detail below, in some embodiments the prior and/or current intraday balances (e.g., as part of the aggregated liquidity information 170) may be presented in a graphical form, which may allow users to readily identify transaction trends associated with incoming and/or outgoing payments of client 110. In an embodiment, the liquidity analyzer 150 may be configured to present the aggregated liquidity information 170 in a graphical format, as described in greater detail below. As an example, the liquidity analyzer 150 may be configured to illustrate transaction trends in a manner that may depict peaks and valleys of surpluses and shortages of available liquid assets, which may indicate an ability to utilize excess funds, or a requirement to collect owed funds or input additional funds (e.g., to manage intraday credit needs), at various points over time. In an embodiment, the aggregated liquidity information 170 may be updated in real time by the data aggregator 160, which may pull the liquid asset information 140 from each of the subsystems 130 on demand (e.g., continuously while the user is viewing the display over the user interface 180) or at periodic points throughout the day (as opposed to only once a day, such as at the end of the day for that day's transactions).

In an embodiment, the liquid asset information 140 may include one or more of opening balances by account and/or by date, current and historical transaction summary information, batch transaction summary information, and details (e.g., textual details) for a given transaction or account. In an embodiment, the liquidity analyzer 150 may be configured to provide account balance charting. For example, in an embodiment, a user may be able to select one or more of a type of chart, currency, account(s), date(s), and interval, and may graphically present the historical and current day balance information in real time. It may be appreciated that in an embodiment the liquidity analyzer 150 (e.g., the data aggregator 160 thereof) may query the liquid asset information 140 from each of the subsystems 130 in response to the user selecting to generate a chart, and may then isolate desired qualities from the aggregated liquidity information 170 for presentation in the chart. In an embodiment, the liquidity analyzer 150 may be configured to generate one or more of a running balances chart, a credits and debits chart, a peaks and valleys chart, and a blended average chart. In an embodiment, the chart may be presented over a date/time interval (e.g., a user selected interval). In an embodiment, as described in greater detail below, the chart may be interactive to facilitate selecting individual transactions or groups of transactions associated with a particular date/time selected on the chart. In an embodiment, each of the transactions may further be selected, and details of the transactions may be viewed by users of the liquidity analyzer 150.

It may be appreciated that in some embodiments, the charts may be exportable or printable by the users. For example, transactions for a selected point may be exportable in a comma separated value (CSV) file, or the chart and associated transactions visible therein may be exportable into an electronic document file (e.g., a PDF file). In some embodiments where transactions may be exported to a CSV file, transactions associated with a selected point of the chart may be exported, while unselected portions of the chart may be omitted. In an embodiment, the selected point of the chart and anticipated items (if any were entered) may be exported to a CSV file or an electronic document file. In an embodiment where the user interface is implemented over a markup language (e.g., HTML), and displayed via a web-browser (e.g., over the internet or an intranet), a printable view may be generated for creation of a hard copy of the selected views. In some embodiments, one or more of the current views of the chart, anticipated items, and associated transactions for the selected point may be converted to a printable view for generation of a standardized hard copy.

In an embodiment, a user of the user interface 180 (e.g., the client 110, or users at the financial service provider 100 in some embodiments or modes of operation) may be able to control operation of the liquidity analyzer 150. As such, further details of the configuration of the liquidity analyzer 150, the data aggregator 160, and other features of the financial service provider 100 may be understood with reference to the user interface 180.

As described in greater detail below, FIGS. 2A-5 illustrate exemplary embodiments of a graphical user interface 200 that may be displayed via the user interface 180. It may be appreciated that the graphical user interface 200 may be displayed on a system of the user (e.g., the client 110), while the user interface 180 at the financial services provider 100 may serve the data to the system of the user in a manner readily interpreted by the system of the user. For example, in the illustrated embodiment, the graphical user interface 200 comprises a markup language form viewable on a web-browser. In various embodiments, programmatic languages may be interfaced with the graphical user interface 200, including but not limited to Java script, XML, or other such scripts or applets, which may facilitate receiving readily updatable data streams from the liquidity analyzer 150.

In an embodiment, a user may select one or more of account currency, one or more accounts, date or range of dates, and interval of time as chart generation criteria to generate an associated chart (e.g., the running balance, blended average, peaks and valleys, or credits and debits charts, as described herein). In an embodiment, each point on the chart may contain date, transaction, and balance information culled from the liquid asset information 140 (e.g., as aggregated in the aggregated liquidity information 170). In an embodiment, the user may utilize the graphical user interface to interact with the chart. For example, in an embodiment, the user interface 180 may be configured so that when a user such as the client 110 utilizes a mouse or other interface device to hover the cursor over a point on the chart, information such as the date, transaction, and/or balance information may be presented as a pop-up display. In an embodiment, a user may view transactions for a particular point on the chart by clicking on the chart at the desired point. In an embodiment, by selecting a given transaction, details of the transaction may be presented to the user.

Figure 2A:
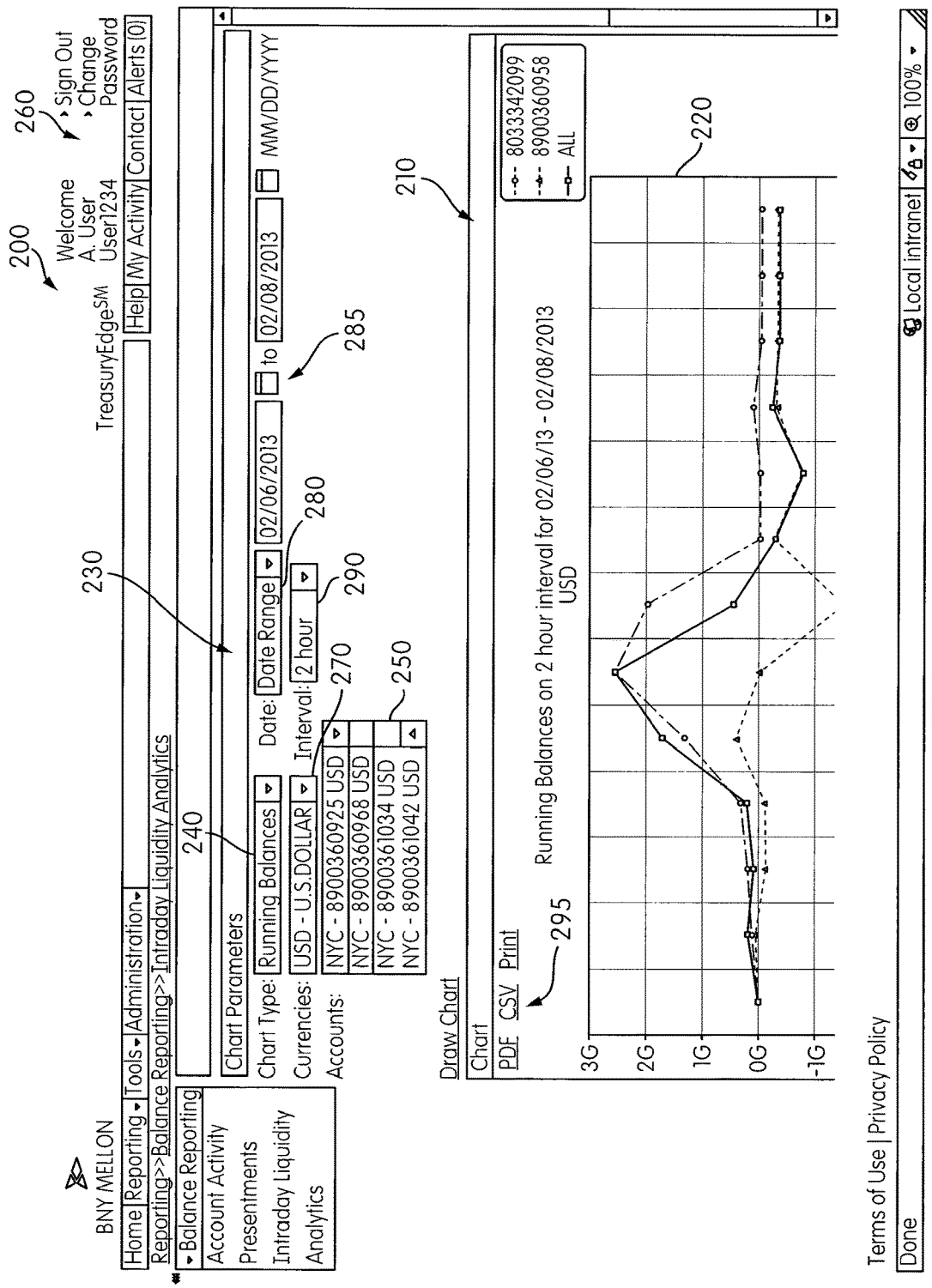

As shown in FIG. 2A, a chart view 210 of the graphical user interface 200 may visually depict a chart 220 developed according to chart parameters 230. As shown, in an embodiment a chart type may be selected at 240. In the illustrated embodiment of FIG. 2A, the chart type selected at 240 is running balances, which depicts in the chart 220 the balances over time. In other embodiments, blended average, peaks and valleys, or credits and debits charts may alternatively be selected at 240, as described in greater detail below.

In an embodiment, the chart parameters 230 may be configured to allow for selection of one or more accounts to plot on the chart 220. As shown, an account list 250 may be depicted in the chart parameters 230, and one or more accounts may be selected by the user. In an embodiment, the account list 250 may be loaded with accounts that the user is entitled to access (e.g., that user's own accounts), which may be associated with the user's login at 260. In an embodiment, multiple account selection may be possible. In an embodiment, a search feature for accounts may also be presented, so that a user may locate particular accounts based on features thereof, such as account identifier, age, or so on. In an embodiment, an "all accounts" option may be provided to select all chartable accounts. In an embodiment where a maximum number of accounts may be selected for plotting on the chart 220, the "all accounts" option may be obscured or otherwise may be unselectable when there are more available accounts than can be plotted together.

In an embodiment, accounts selected for plotting on the chart 220 may be required to be of the same currency. As such, in an embodiment a currency type 270 may be depicted and selected. In an embodiment, selecting a currency type 270 may modify the accounts shown in the account list 250, so as to present the accounts having that currency, and prevent accounts of different currencies from being plotted together. In an embodiment, a currency exchange feature may be provided in the graphical user interface 200, so as to facilitate estimating values in a standard currency (e.g., so as to facilitate graphical comparison between accounts of different currencies). In an embodiment, the currencies illustrated at currency type 270 may be selected based on those in which associated accounts are available for the user. In an embodiment, United States Dollars may be the default currency type 270. In an embodiment, currencies listed at currency type 270 may be presented in alphabetical order.

As shown, the chart parameters 230 may include a date selection 280. In an embodiment, the date selection 280 may include selecting from a date range, the current date, a prior date, or a single date. In an embodiment, the single date or range of dates may be selectable at 285. In an embodiment, future date selection may be prevented. In an embodiment, a maximum date range may be associated with certain charts. For example, in an embodiment, the maximum date range for some charts (e.g., running balance) may be thirty calendar days. In an embodiment, a blended average chart may be limited to 14 calendar days. In an embodiment, users may be able to select from a set time period of balance history. For example, in an embodiment, a user may view up to six months (e.g., one hundred and eighty days) of balance history. In some embodiments, the transaction dates may be the posting date based on the account time zone. In an embodiment, the transaction dates may be the insertion date. In an embodiment, such as when a user plots by current or prior date, the posting date may be utilized to identify transactions, while the timeline of the chart 220 may be based on the insertion date/time for the selected posting date, based on a standard time zone (e.g., Eastern Time).

As shown at 290, in an embodiment the chart parameters 230 may include determining an interval for the chart 220 at which current data is sampled. For example, in various embodiments the interval may be 15 minutes, 30 minutes, 1 hour, 2 hours, 4 hours, 6 hours, 12 hours, 1 day, or so on. In an embodiment, the interval at 290 may be automatically adjusted depending on the date range selection at 280 and 285. For example, in an embodiment, if the chart 220 is based on a single day, the default interval may be 96 data points (e.g., 4 data points per hour for 24 hours, for a total of 96 data points). In an embodiment, the default interval for between 2-14 days plotted may be a minimum of every two hours (and thus a default of 12 data points per day for 14 days plotted, for a total of 168 data points). In an embodiment, the default interval for between 15 and 30 days may be a minimum of every 4 hours (and thus a default of 6 data points per day for 30 days plotted, for a total of 180 data points). Other intervals may be selected in some embodiments, while in some embodiments certain intervals may be obscured from the list of intervals at 290 if those intervals would result in too many data points to plot in the chart 220.

The chart 220 illustrated in the example of FIG. 2A indicates running balances for a two hour interval over a period of two days. It may be appreciated that in an embodiment, a running balances chart may be configured to initially display a summary plot (e.g., summing over all account balances to indicate overall liquidity). In an embodiment, other series of data may be generated by the liquidity analyzer 150, however might be obscured from the chart 220 until selected for display form the chart's legend. In an embodiment, if only a single account was selected, that account may be initially displayed in the chart 220 as configured by the chart parameters 230. In some embodiments, any appropriate number of series (e.g., for each of a plurality of accounts and/or for the summary (e.g., designated as "all" in the legend of chart 220 in FIG. 2) may be depicted initially on the chart 220.

As noted above, other chart types may be generated, such as by selecting from those chart types at 240. In an embodiment, a blended average chart may provide the running balances of a given account for each date of a selected date range, on a given time interval. As such, in an embodiment the graphical user interface 200 may force a date range to be selected at 280 and 285. In an embodiment, the blended average chart may depict a series representing one day of the selected date range. The chart may also contain an average series for each selected date, averaging all selected accounts for that date. In an embodiment, the chart may initially display the average series, but the user may be able to select different series for each date selected.

Figure 2B:
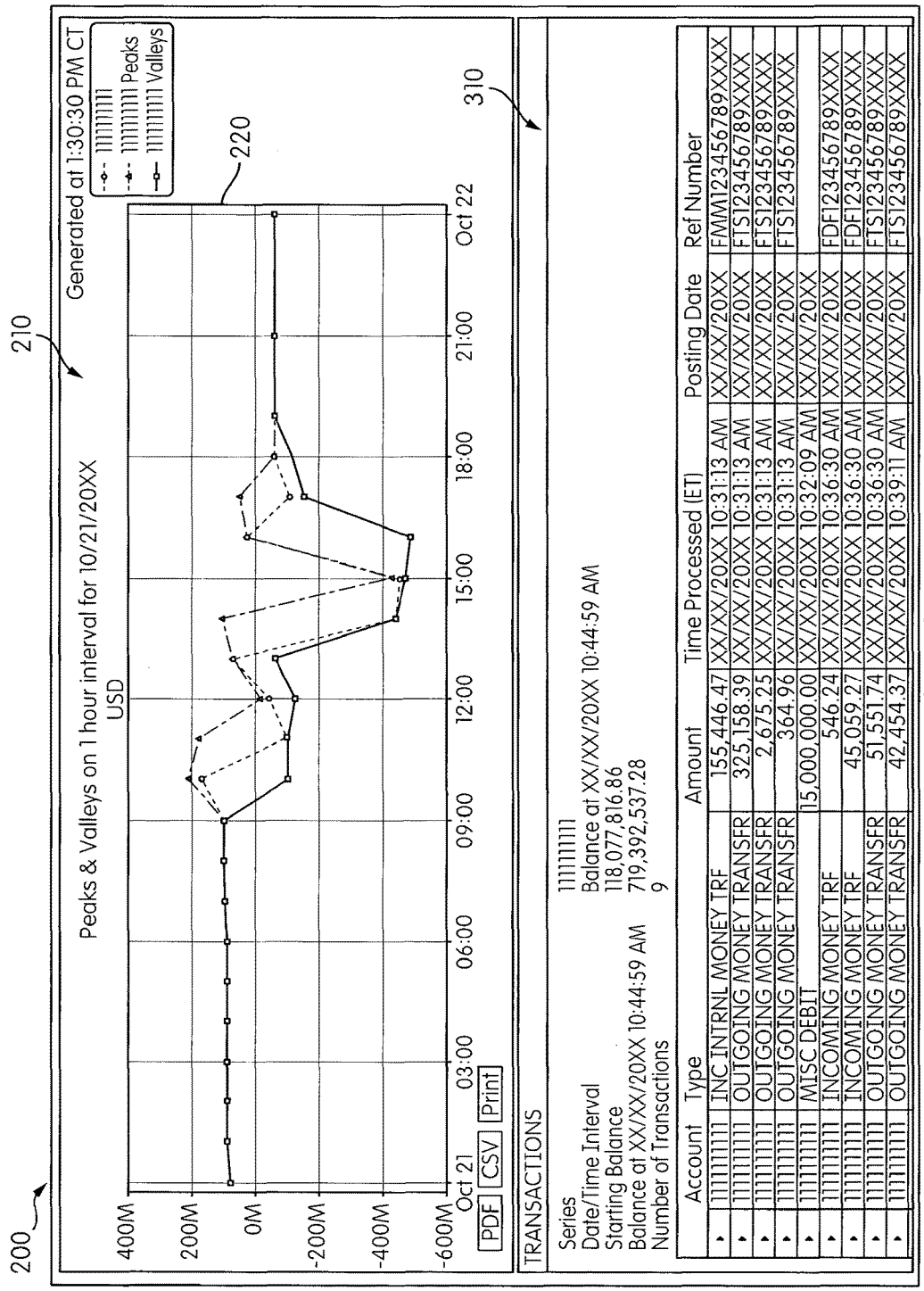

In an embodiment, a peaks and valleys chart may be generated, such as is illustrated in FIG. 2B. As shown therein, the peaks and valleys chart may contain three series for each selected account. A running balance series may be generated, which may be similar to that generated and plotted in the running balance chart. A peaks series may be generated, representing a maximum balance value for each interval. A valleys series may be generated, representing a minimum balance value for each interval. In an embodiment, each point may contain a min/max balance value, and may contain a timestamp within the interval when this value was reached. In an embodiment, if multiple accounts were selected at 250, the chart may initially contain a balance, peaks, and valleys summary series, while other series may be hidden unless selected from the chart's legend. It may be appreciated that the balance data for the peaks and valleys chart may be obtained in real time from the other subsystems 130. Accordingly, the maximum and minimum balance values may be the highest and lowest balances for all accounts, or for individual accounts, either alone, or in aggregate. In an embodiment, current data may be stored in one system, while prior and historical data may be archived in another system, both of which may be accessed by the liquidity analyzer 150 for interpretation via the user interface 180.

Figure 2C:
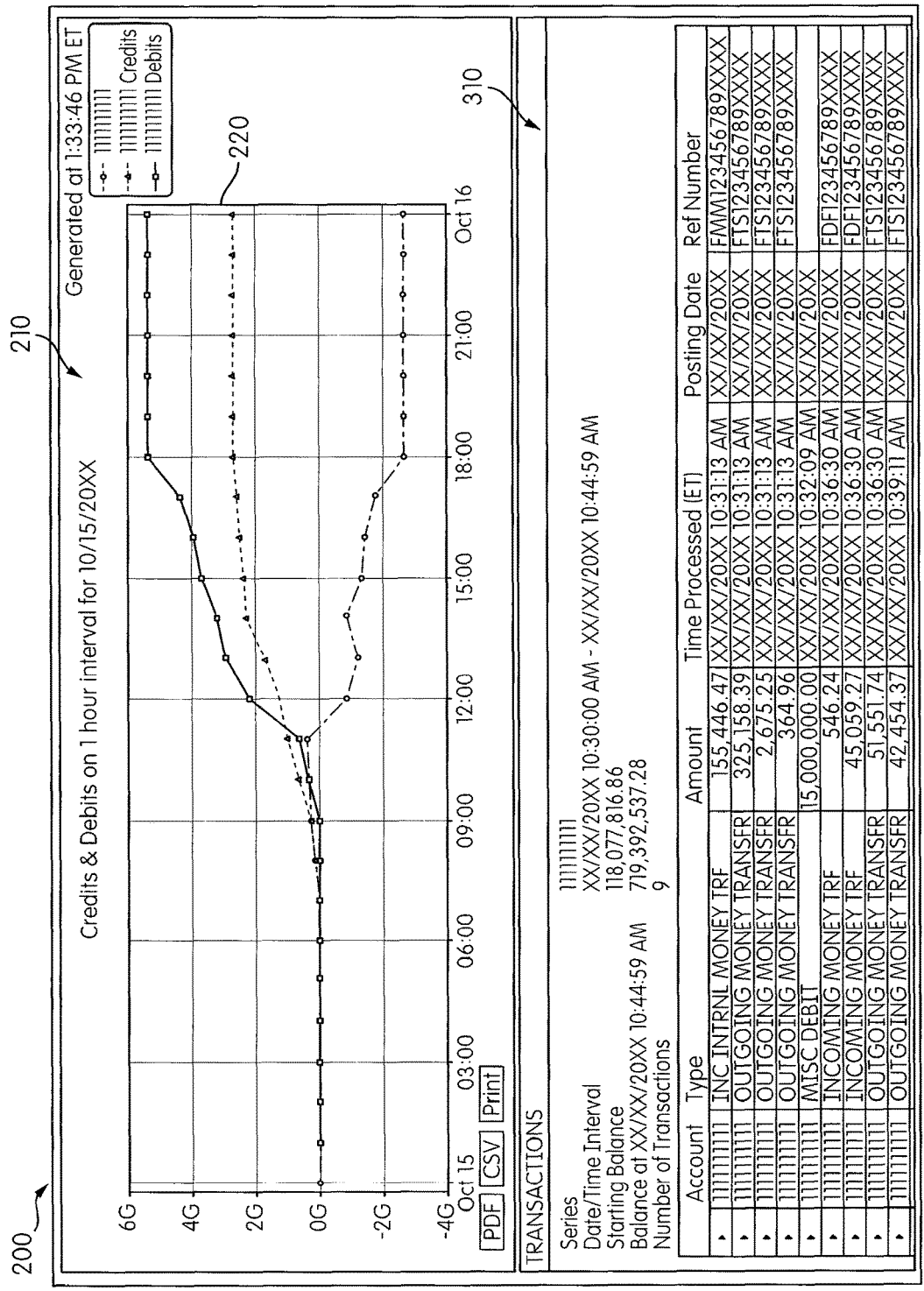

In an embodiment, a credits and debits chart may be generated, such as is illustrated in FIG. 2C. As shown therein, the credits and debits chart may contain the running balance series, a credits series (representing the credits balance value for each interval), and a debits series (representing the debit balance value for each interval). In an embodiment, both credit and debit balances may be positive values. In an embodiment, if multiple accounts were selected at 250, the chart may initially contain a balance, credits, and debits summary series, while other series may be hidden unless selected from the chart's legend. It may be appreciated that the data for the credits and debits chart may be obtained in real time from the other subsystems 130. Accordingly, as clients receive payments coming in (credits), and money going out (debits), that data may be presented for all accounts, or for individual accounts, either alone, or in aggregate. In an embodiment, the credits and debits may be aggregated over time for the time period viewed. Again, in some embodiments the current data may be retrieved from one system, while prior and historical data may be retrieved from another system, both of which may be accessed by the liquidity analyzer 150 for interpretation via the user interface 180.

As described above, in an embodiment printing a paper copy of the chart 220 (and associated data described further herein) or creating a document record (e.g., an electronic document or a CSV file) may be facilitated by selecting an appropriate designator at 295. Specifically, a PDF file, a comma separated file (e.g., a text file), or a printable markup language view may be generated through selecting one of the designators at 295. In an embodiment, the printable markup language view may omit one or more of data entry fields, links, and buttons, and in some embodiments may modify the screen layout to better fit on a printed page. In an embodiment, the chart 200 and/or listed transactions (described below) may be included in the printable view.

Figure 3:
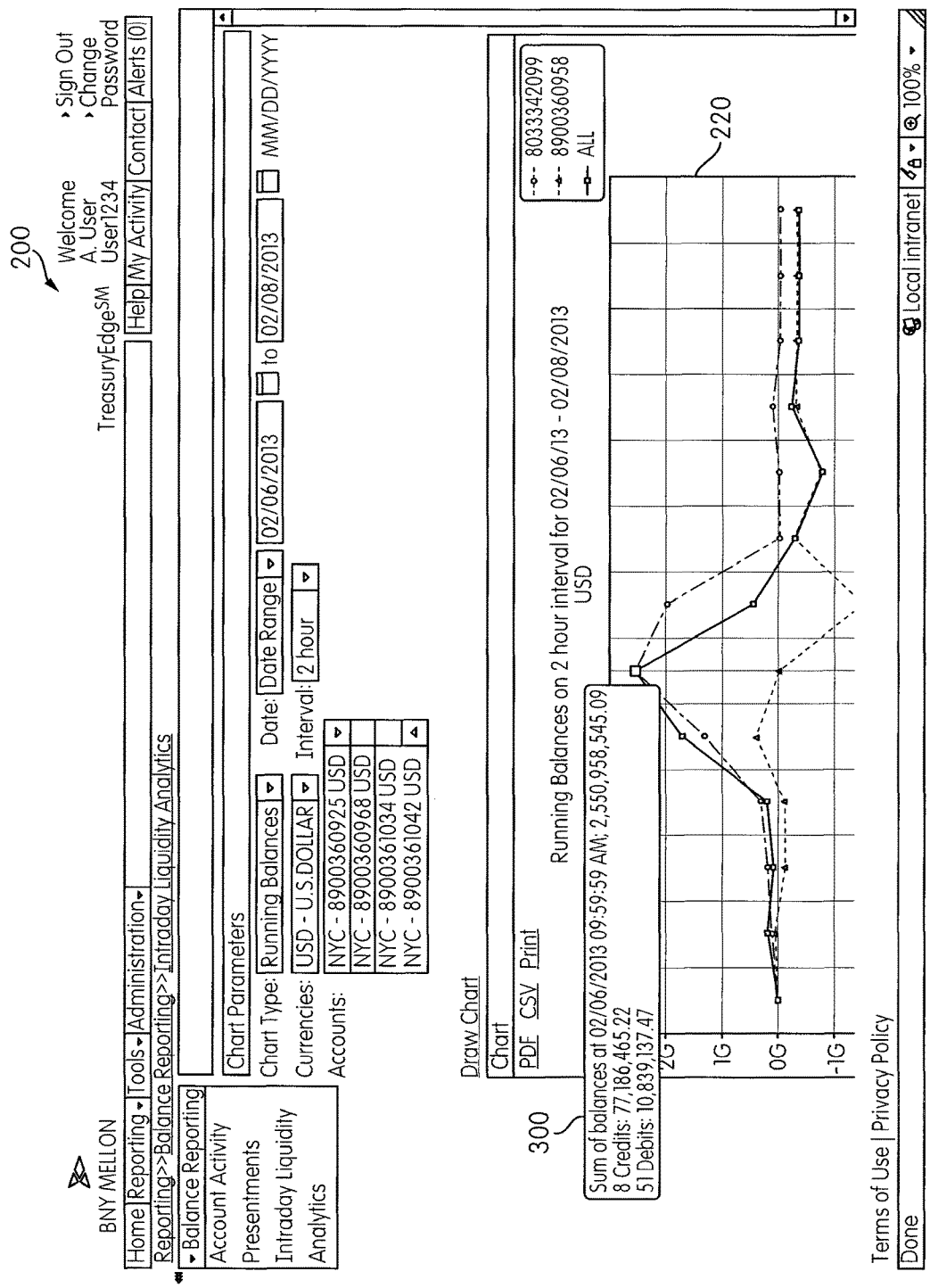

According to an embodiment, as illustrated in greater detail at FIG. 3 (based on the chart 220 of FIG. 2a), the user interface 180 may be configured to cause the graphical user interface 200 to display transaction information 300 associated with that data point on the chart 220. For example, in an embodiment the transaction information 300 may be made visible by the user selecting one of the plotted data points (e.g., by clicking on or hovering over the point via the graphical user interface 200). In an embodiment, such as that illustrated, each transaction information 300 associated with the data point accessible by hovering over the data point may be summary transactional information. In an embodiment, the balances shown (e.g., on the Y axis of the chart 220) may illustrate the live data coming in (e.g., same day data), or the archived/historical data. In an embodiment, selecting the data point may additionally or alternatively provide detailed transaction information. For example, in an embodiment where hovering over the data point may display the summary transaction information 300 illustrated in FIG. 3, clicking on the data point (e.g., with a mouse button) may provide the detailed transaction information.

Figure 4:
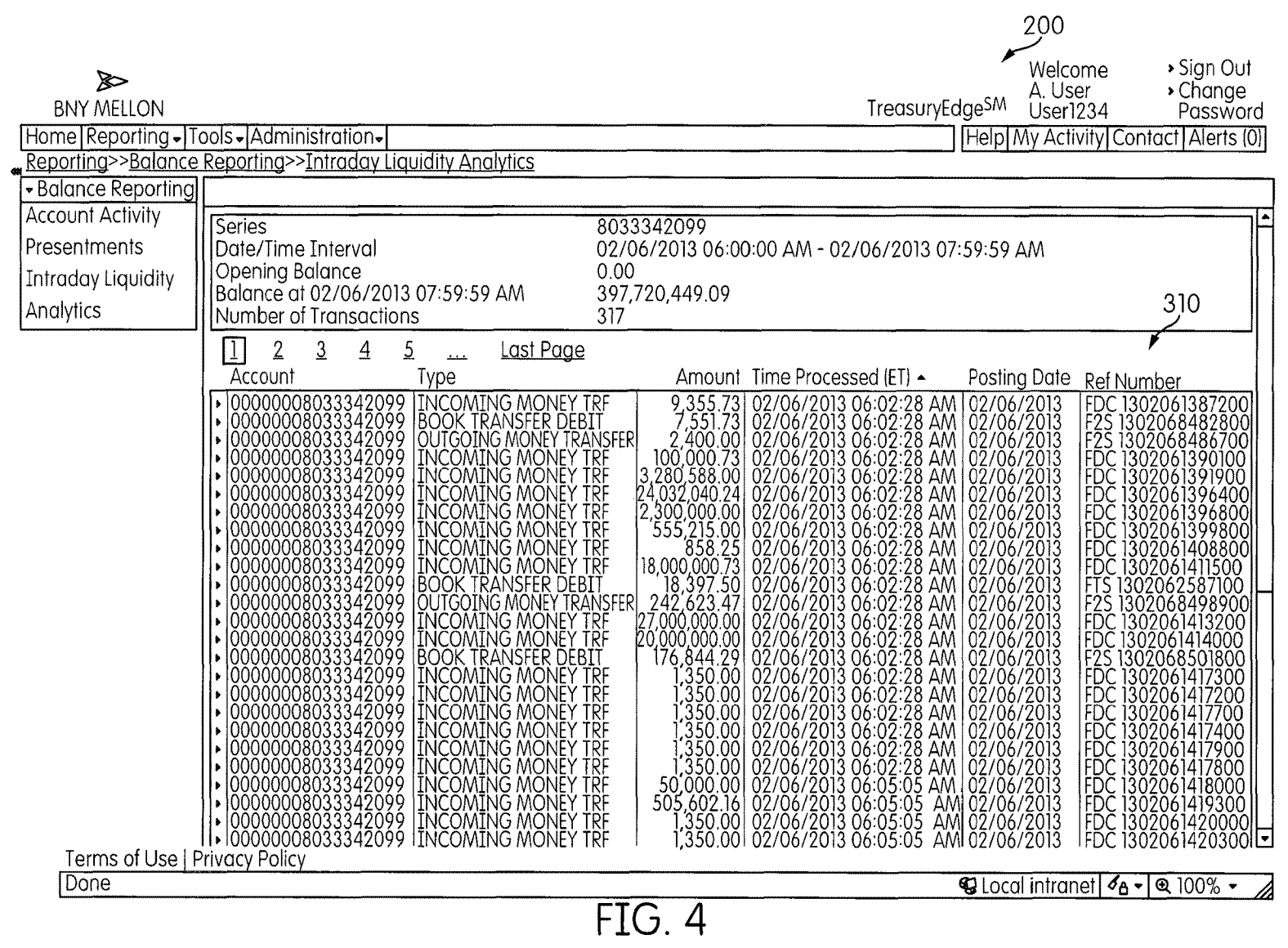

FIG. 4 illustrates a detailed transaction information view 310 of the graphical user interface 200. As shown, information regarding the transactions that posted within the interval represented by the data point on the chart 220 may be displayed to the user. In an embodiment, the information may include one or more of a transaction type/description, an account, an amount, a processed date/time, a value date (e.g., the posting date), a reference number, and so on. In an embodiment, the graphical user interface 200 may be configured to allow the user to sort the transactions by the information types in ascending or descending order. In an embodiment, additional information regarding the selected data point, such as the account number (e.g., the charted series), the date interval, the account opening balance, the available balance (e.g., at the end of the point interval), and the number of transactions within the interval. In an embodiment, if more than a maximum number of transactions are included within the detailed transaction information view 310, a subset may be displayed, along with an indicator requesting the user to narrow the chart interval. In an embodiment, selecting a point on the summary series, as described above, may display transactions for all selected accounts within the point's interval. In an embodiment, selecting a point on a blended average chart's "average" series may display transactions for all selected dates within the point's interval.

Figure 5:
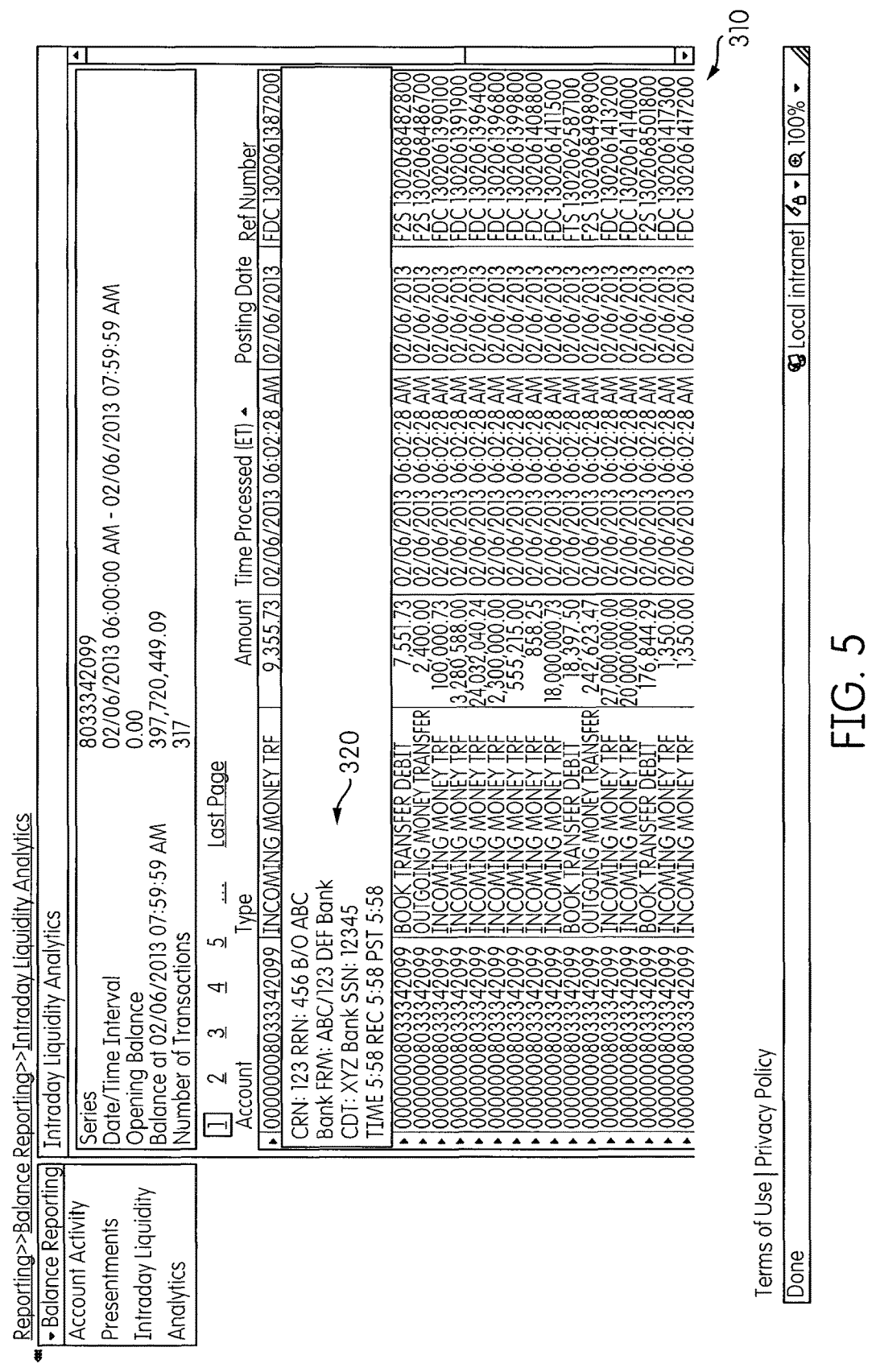

As illustrated in FIG. 5, in an embodiment additional transaction details 320 may be viewed by selecting any of the transactions listed in the detailed transaction information view. For example, in an embodiment each transaction may have an associated detail text which may be retrieved from the financial services provider 100 (e.g., via the liquidity analyzer 150, or other subsystem 130) by selecting the transaction. In an embodiment, the row of the transaction may expand and collapse to selectively show the additional transaction details 320 for the selected transaction. In an embodiment, the additional transaction details may illustrate the transaction detail in wire-text, which may show the details behind wire payments associated with the transactions, or another appropriate format for conveying details associated with the transaction.

In some embodiments, an audit record may be created, associated with generated charts. In an embodiment, the audit record may be updated when data is exported into a CSV file or an electronic document file. In some embodiments, the audit record may store past outputs for future retrievals by the user.

Those skilled in the art will appreciate that the embodiments described herein can be implemented using a server, computer, database, communications and programming technology, each of which implements hardware or software or any combination thereof. Embodiments of this disclosure may be implemented in the form of a computer program product on a computer-readable storage medium having computer-readable program code means embodied in any suitable computer-readable storage medium, including hard disks, CD-ROM, RAM, ROM, optical storage devices, magnetic storage devices, and/or the like.

Figure 6:
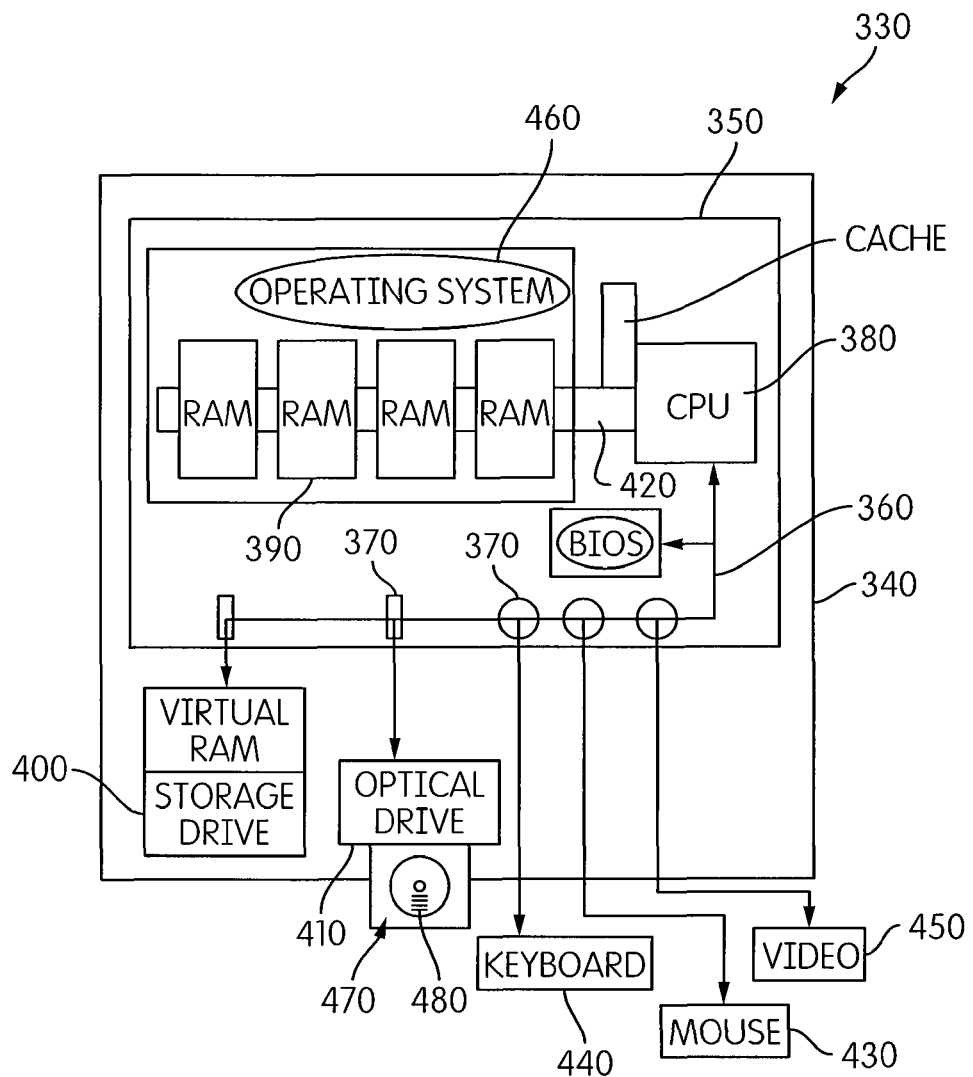
FIG. 6 illustrates an exemplary computer system configured to perform the functions of systems and methods described herein.

For example, FIG. 6 illustrates a high level block diagram of an exemplary computer system 330 which may be used to perform embodiments of the processes disclosed herein, including but not limited to processes comprising retrieving the liquid asset information 140 from each of the subsystems 130 at the financial services provider 100, aggregating the liquid asset information 140 into the aggregated liquidity information 170, generating the charts 220 based thereon, and transmitting the charts 220 to a user. It may be appreciated that in some embodiments, the system performing the processes herein may include some or all of the computer system 330. In some embodiments, the computer system 330 may be linked to or otherwise associated with other computer systems 330. In an embodiment the computer system 330 has a case 340, enclosing a main board 350. The main board has a system bus 360, connection ports 370, a processing unit, such as Central Processing Unit (CPU) 380, and a data storage device, such as main memory 390, storage drive 400, and optical drive 410. Each of main memory 390, storage drive 400, and optical drive 410 may be of any appropriate construction or configuration. For example, in some embodiments storage drive 400 may comprise a spinning hard disk drive, or may comprise a solid-state drive. Additionally, optical drive 410 may comprise a CD drive, a DVD drive, a Blu-ray drive, or any other appropriate optical medium.

Memory bus 420 couples main memory 390 to CPU 380. A system bus 460 couples storage drive 400, optical drive 410, and connection ports 370 to CPU 380. Multiple input devices may be provided, such as for example a mouse 430 and keyboard 440. Multiple output devices may also be provided, such as for example a video monitor 450 and a printer (not shown). In an embodiment, such output devices may be configured to display information regarding the processes disclosed herein, including but not limited to cash amounts, transaction details, and so on. It may be appreciated that the input devices and output devices may alternatively be local to the case 340 and the computer system 330, or may be located remotely (e.g., interfacing with the computer system 330 through a network or other remote connection).

Computer system 330 may be a commercially available system, or may be proprietary design. In some embodiments, the computer system 330 may be a desktop workstation unit, and may be provided by any appropriate computer system provider. In some embodiments, computer system 330 comprise a networked computer system, wherein memory storage components such as storage drive 400, additional CPUs 380 and output devices such as printers are provided by physically separate computer systems commonly tied together in the network. Those skilled in the art will understand and appreciate the physical composition of components and component interconnections comprising computer system 330, and select a computer system 330 suitable for performing the methods disclosed herein.

When computer system 330 is activated, preferably an operating system 460 will load into main memory 390 as part of the boot sequence, and ready the computer system 330 for operation. At the simplest level, and in the most general sense, the tasks of an operating system fall into specific categories—process management, device management (including application and user interface management) and memory management.

In such a computer system 330, the CPU 380 is operable to perform one or more embodiments of the methods described above. Those skilled in the art will understand that a computer-readable medium 470, on which is a computer program 480 for performing the methods disclosed herein, may be provided to the computer system 330. The form of the medium 470 and language of the program 480 are understood to be appropriate for computer system 330. Utilizing the memory stores, such as one or more storage drives 400 and main system memory 390, the operable CPU 380 will read the instructions provided by the computer program 480 and operate to perform the methods disclosed herein, such as process 300.

Figure 7:
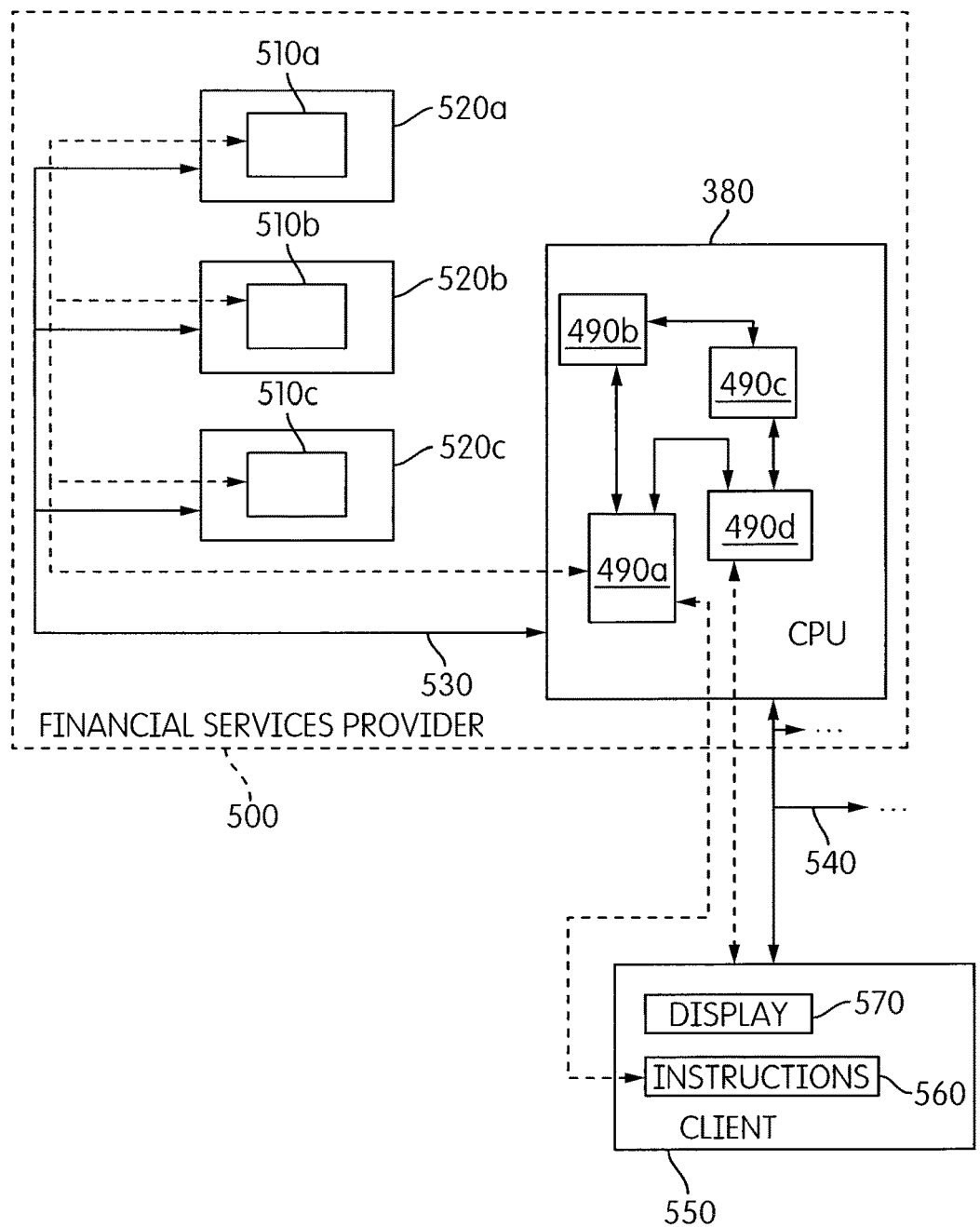
FIG. 7 illustrates another embodiment of a system configured to perform the functions of systems and methods described herein.

As shown in FIG. 7, in some embodiments the CPU 380 (either alone or in conjunction with additional CPUs 380) may be configured to execute one or more computer program modules 490, each configured to perform one or more functions of the processes described herein. For example, in the illustrated embodiment, at a CPU 380 operated by a financial service provider 500, a computer program module 490a may be configured to aggregate liquid asset data 510 from each of a plurality of financial subsystems 520 of the financial services provider 500. In the illustrated embodiment, there are three financial subsystems (520a-c) depicted, each having its own associated liquid asset data 510a-c. In various embodiments, the financial subsystem 520 may be similar to the financial subsystems 130 described above, and likewise the liquid asset data 510 may be similar to the liquid asset data 140 as discussed above. In an embodiment, the liquid asset data 510 may be associated with one or more storage drives 400, accessible by the CPU 380 directly or indirectly (e.g., via the system bus 360, or via a network 530, such as is illustrated). Accordingly, in an embodiment each of the financial subsystems 520 may comprise their own CPUs and storage systems. In an embodiment, the network 530 may be an internal network between the CPU 380 running the computer program modules 490. In an embodiment, the network 530 may link to a network 540 coupling the financial services provider 500 to one or more clients 550. While a single client 550 is illustrated in FIG. 7, other clients 550 may be linked via the network 540. In an embodiment, users of the system may be within the financial services provider 500, and may provide administrative functions for the client 550, and users thereat, for example.

In an embodiment, the liquid asset data 510 from the financial subsystems 520 may be aggregated as aggregated liquidity data which may be retrieved by the computer program module 490a. For example, the computer program module 490a may be configured to access and manipulate, on electronic storage media such as the storage drive 400, liquidity or transaction information for accounts associated with the client 550 on each of the financial subsystems 520. In an embodiment, the aggregated liquidity information may be similar to that described above as aggregated liquidity information 170. As shown, in an embodiment each of the client 550 may be able to manipulate or filter results of the aggregation by the computer program module 490a, such as by providing instructions 560 to the computer program module 490a, or other computer program modules 490 associated with the financial services provider 500. In an embodiment, default instructions may be proposed to the client 550, and may be based on the aggregated liquidity data, as described above. In an embodiment, the computer program module 490a may be configured to receive the instructions 560 from the client 550 via a graphical user interface, such as that described above. In an embodiment, the computer program module 490a may be configured to execute an SQL query for a requested account list and date range, and may summarize and order the received liquidity data according to the requested date and time interval. In an embodiment, the computer program module 490a may calculate the balance (total, credit, and debits), and the minimum and maximum balance for each interval.

In an embodiment, a computer program module 490b may parse the aggregated liquidity data, across each of a plurality of categories described in the liquidity data. In an embodiment, the parsing may comprise calculating the balance (total, credit, and debits), and the minimum and maximum balance for each interval. In other embodiments, the computer program module 490a may be configured to retrieve data from the financial subsystems 520 based on the instructions 560, which may guide the parsing at the computer program module 490b. Regardless, it may be appreciated that in an embodiment the aggregated liquidity data may be retrieved and parsed contemporaneously with receipt of the instructions from the user (e.g., the instructions 560 from the client 550). Such parsing may comprise manipulation of the data aggregator 160 or other components of the liquidity analyzer 150 described above, or a similar mechanism. In an embodiment, the computer program module 490b may be linked with the computer program module 490a, may be a part of the computer program module 490a, or may otherwise be associated with the computer program modules 490 on one or more of the CPUs 380.

In an embodiment, a computer program module 490c may be configured to generate one or more charts showing analytical views of the parsed aggregated liquidity data. As described herein, in various embodiments the charts may comprise one or more of a running balance chart, a blended average chart, a peaks and valleys chart, and a credits and debits chart. In an embodiment, the chart may be generated based on criteria selected by the user (e.g., the client 560), as described below. For example, as described above with reference to the graphical user interface 200, in various embodiments the date(s) and intervals of transactions retrieved from the financial subsystems (e.g., via the computer program module 490a) may be utilized in the parsing via computer program module 490b and the generating via computer program module 490c.

It may be appreciated that in an embodiment, a computer program module 490d may be configured to transmit, for viewing on an electronic display communicatively linked with the one or more processors, a graphical user interface, such as the graphical user interface 200 described above, which may be displayed on a display (such as the display 570 at the client 550). It may be appreciated that the graphical user interface may facilitate transmission of the instructions 560 between the client 550 and the financial services provider 500. Accordingly, in an embodiment the client 550 or other user of the systems and processes described herein may provide the instructions 560 via the graphical user interface transmitted by the computer program module 490d, which may instruct the computer program module 490a in contemporaneously (e.g., beginning immediately responsive to receiving the instructions) retrieving and aggregating the liquidity data, and generating the charts accordingly. As such, while in each of the program modules 490 are shown as linked in serial in FIG. 7, it may be appreciated that the program modules 490 may each be linked with each other, on the same CPU 380, or across a plurality of CPUs 380. In effect, in an embodiment, a plurality of modules 490, operating over one or more CPUs 380, may cooperate with one another to perform the methods described herein.

The above-discussed embodiments and aspects of this disclosure are not intended to be limiting, but have been shown and described for the purposes of illustrating the functional and structural principles of the inventive concept, and are intended to encompass various modifications that would be within the spirit and scope of the following claims.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A system for analyzing liquidity data for a client of a financial services provider, the system comprising:
   a computer system, at the financial services provider, comprising one or more physical processors programmed with computer program instructions that, when executed by the one or more physical processors, program the computer system to:
   receive a first request from a client to generate a liquidity analysis based on client accounts associated with disparate financial subsystems of the financial provider, at least one of the client accounts being an account in one of the disparate financial subsystems, and at least another one of the client accounts being an account in another one of the disparate financial subsystems;
   responsive to receiving the first request, querying the disparate financial subsystems to obtain liquidity data associated with the client accounts from the disparate financial subsystems as aggregated liquidity data, the aggregated liquidity data including cash flows in transactions associated with the client accounts in the disparate financial subsystems;
   cause a graphical depiction of at least a portion of the aggregated liquidity data over a time interval to be presented at a client device without a graphical depiction of another portion of the aggregated liquidity data;
   receive a subsequent request from the client device for presentation of the other aggregated liquidity data portion; and
   cause the graphical depiction of the other aggregated liquidity data portion to be presented at the client device without further querying of the disparate financial subsystems based on the liquidity data obtained in response to the first request, such that no querying of the disparate financial subsystems occurs from the subsequent request.

2. The system of claim 1, wherein the one or more physical processors are further programmed to:
   aggregate the liquidity data from the disparate financial subsystems on the one or more processors of the computer system contemporaneously upon receiving the first request.

3. The system of claim 1, wherein the time interval is received from the client with the first request.

4. The system of claim 1, wherein the client accounts are identified in the first request.

5. The system of claim 1, wherein the graphical depiction is configured to be displayed on the client device adjacent to an input for the first request.

6. The system of claim 1, wherein the input for the first request comprises a graphical user interface transmitted from the computer system at the financial services provider to the client device.

7. The system of claim 1, wherein the graphical depiction includes displaying balances associated with each of the accounts over the time interval.

8. The system of claim 1, wherein the graphical depiction includes displaying balances of a given account for each date of a selected date range received in the first request, over the time interval.

9. The system of claim 1, wherein the graphical depiction includes displaying for each of a plurality of data points over the time interval, a maximum balance value and a minimum balance value.

10. The system of claim 1, wherein the graphical depiction includes displaying for each of a plurality of data points over the time interval, credit balance value and debit balance value.

11. A computer implemented method for analyzing liquidity data for a client of a financial services provider, wherein the method is implemented in a computer system comprising one or more physical processors programmed with computer program instructions that, when executed by the one or more physical processors, cause the computer system to perform the method, the method comprising:
   receiving, via the one or more physical processors, a first request from a client to generate a liquidity analysis based on client accounts associated with disparate financial subsystems of the financial provider, at least one of the client accounts being an account in one of the disparate financial subsystems, and at least another one of the client accounts being an account in another one of the disparate financial subsystems;
   responsive to receiving the first request, querying the disparate financial subsystems, via the one or more physical processors, to obtain liquidity data associated with the client accounts from the disparate financial subsystems as aggregated liquidity data, the aggregated liquidity data including cash flows in transactions associated with the client accounts in the disparate financial subsystems;
   cause, via the one or more physical processors, a graphical depiction of at least a portion of the aggregated liquidity data over a time interval to be presented at a client device without a graphical depiction of another portion of the aggregated liquidity data
   receive, via the one or more physical processors, a subsequent request from the client device for presentation of the other aggregated liquidity data portion; and
   causing, via the one or more physical processors, the graphical depiction of the other aggregated liquidity data portion to be presented at the client device without further querying of the disparate financial subsystems based on the liquidity data obtained in response to the first request, such that no querying of the disparate financial subsystems occurs from the subsequent request.

12. The method of claim 11, wherein the one or more physical processors are further programmed to aggregate the liquidity data from the disparate financial subsystems on the one or more processors of the computer system contemporaneously upon receiving the first request.

13. The method of claim 11, wherein the time interval is received from the client with the first request.

14. The method of claim 11, wherein the client accounts are identified in the first request.

15. The method of claim 11, wherein the graphical depiction is configured to be displayed on the client device adjacent to an input for the first request.

16. The method of claim 15, wherein the input for the first request comprises a graphical user interface transmitted from the computer system at the financial services provider to the client device.

17. The method of claim 11, wherein the graphical depiction includes displaying balances associated with each of the accounts over the time interval.

18. The method of claim 11, wherein the graphical depiction includes displaying balances of a given account for each date of a selected date range received in the first request, over the time interval.

19. The method of claim 11, wherein the graphical depiction includes displaying for each of a plurality of data points over the time interval, a maximum balance value and a minimum balance value.

20. The method of claim 11, wherein the graphical depiction includes displaying for each of a plurality of data points over the time interval, credit balance value and debit balance value.

* * * * *